US012233668B2

(12) United States Patent
Voss et al.

(10) Patent No.: US 12,233,668 B2
(45) Date of Patent: Feb. 25, 2025

(54) TRUCK TIRE WITH CIRCUMFERENTIAL SIPE HAVING BLIND MICRO SIPES

(71) Applicant: Compagnie Generale des Etablissements Michelin, Clermont-Ferrand (FR)

(72) Inventors: Stefan Voss, Greer, SC (US); Robert Ciprian Radulescu, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 429 days.

(21) Appl. No.: 17/441,864

(22) PCT Filed: Apr. 5, 2019

(86) PCT No.: PCT/US2019/026065

§ 371 (c)(1), (2) Date: Sep. 22, 2021

(87) PCT Pub. No.: WO2020/204942

PCT Pub. Date: Oct. 8, 2020

(65) Prior Publication Data

US 2022/0185025 A1 Jun. 16, 2022

(51) Int. Cl.

*B60C 11/03* (2006.01)
*B60C 11/04* (2006.01)
*B60C 11/12* (2006.01)

(52) U.S. Cl.

CPC ...... *B60C 11/0323* (2013.01); *B60C 11/0302* (2013.01); *B60C 11/04* (2013.01);

(Continued)

(58) Field of Classification Search

CPC ......... B60C 11/0302; B60C 2011/1254; B60C 11/04; B60C 11/124

See application file for complete search history.

(56) References Cited

U.S. PATENT DOCUMENTS 3,570,571 A 3/1971 Riches
6,196,288 B1 * 3/2001 Radulescu .......... B60C 11/0309 152/DIG. 3

(Continued)

FOREIGN PATENT DOCUMENTS

CN 101407159 A 4/2009
JP 2009078654 A * 4/2009

(Continued)

OTHER PUBLICATIONS

JP 2009-078654 Machine Translation (Year: 2009).*
International Search Report and Written Opinion dated Jan. 7, 2020.

*Primary Examiner* — Justin R Fischer
*Assistant Examiner* — Wendy L Boss
(74) *Attorney, Agent, or Firm* — Neal P. Pierotti

(57) ABSTRACT

A heavy truck tire tread is provided that has a rolling direction that is in a longitudinal direction of the tread. A circumferential sipe (20) is present and extends in the longitudinal direction completely around the tread. The circumferential sipe does not bound a sacrificial rib. A plurality of micro sipes (22) engage the circumferential sipe and are located on opposite sides of the circumferential sipe in the lateral direction. The micro sipes extend from the circumferential sipe so as to terminate within rubber of the tread at a terminal end.

11 Claims, 6 Drawing Sheets

(52) U.S. Cl.
CPC ........ *B60C 11/124* (2013.01); *B60C 11/1281* (2013.01); *B60C 2011/1209* (2013.01); *B60C 2011/1245* (2013.01); *B60C 2011/1254* (2013.01); *B60C 2011/129* (2013.01); *B60C 2200/06* (2013.01)

(56) References Cited

U.S. PATENT DOCUMENTS

| | | | |
|---|---|---|---|
| 6,488,064 | B1 | 12/2002 | Radulescu |
| 9,022,083 | B2 | 5/2015 | Voss et al. |
| D856,906 | S | 8/2019 | Mayni et al. |
| D900,012 | S | 10/2020 | Voss |
| 2009/0065115 | A1 | 3/2009 | Mathews |
| 2010/0186860 | A1 | 7/2010 | Georges et al. |
| 2018/0244111 | A1 | 8/2018 | Zhu et al. |

FOREIGN PATENT DOCUMENTS

| | | | |
|---|---|---|---|
| WO | 2017177132 | A1 | 10/2017 |
| WO | 2018158546 | A1 | 9/2018 |

* cited by examiner

TRUCK TIRE WITH CIRCUMFERENTIAL SIPE HAVING BLIND MICRO SIPES

CROSS-REFERENCE TO RELATED APPLICATIONS

The present application is a 35 U.S.C. § 371 application of PCT/US19/26065 filed on Apr. 5, 2019 and entitled "Truck Tire with Circumferential Sipe Having Blind Micro Sipes." PCT/US19/26065 is incorporated by reference herein in its entirety for all purposes.

FIELD OF THE INVENTION

The subject matter of the present invention relates to a truck tire that has improved overall wear life and/or rolling resistance. More particularly, the present application involves a long haul steer tire for a truck that has a circumferential sipe with blind micro sipes that could be directional in orientation.

BACKGROUND OF THE INVENTION

Manufacturers of heavy commercial vehicle tires have historically been challenged with difficulty in improving the wear life of these tires, especially steer tires, due to the onset of irregular wear that leads to the early removal of these tires from service. Attempts to increase wear life have included increasing lateral rigidity by reducing the number of ribs in the sculpture. However, such modifications can lead to a reduction in wet traction performance due to the loss of a tread groove. One design feature that has been implemented to protect steer tires from irregular wear is the use of small, directional micro-sipes at rib edges. Although these micro-sipes protect the rib edges by reducing edge stresses, they could introduce longitudinal forces due to vertical loads. These rib edges are either at the two lateral ends of the tread or are adjacent sacrificial ribs of the tire which are in turn at the two lateral ends of the tread. Sacrificial ribs are at different elevations than the rib edges into which the micro-sipes are included.

It is known to place circumferential sipes into continuous ribs of the tire. Further, it is known to include full-width lateral sipes that extend from these circumferential sipes to adjacent circumferential grooves of the tread. These full-width lateral sipes are effective at generating directional coupling forces to protect the tread. However, full-width lateral sipes are also more prone to heel/toe irregular wear and other localized wear forms. Although mechanisms are known for improving wear life of tires, they come with the acceptance of at least one associated performance trade off. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
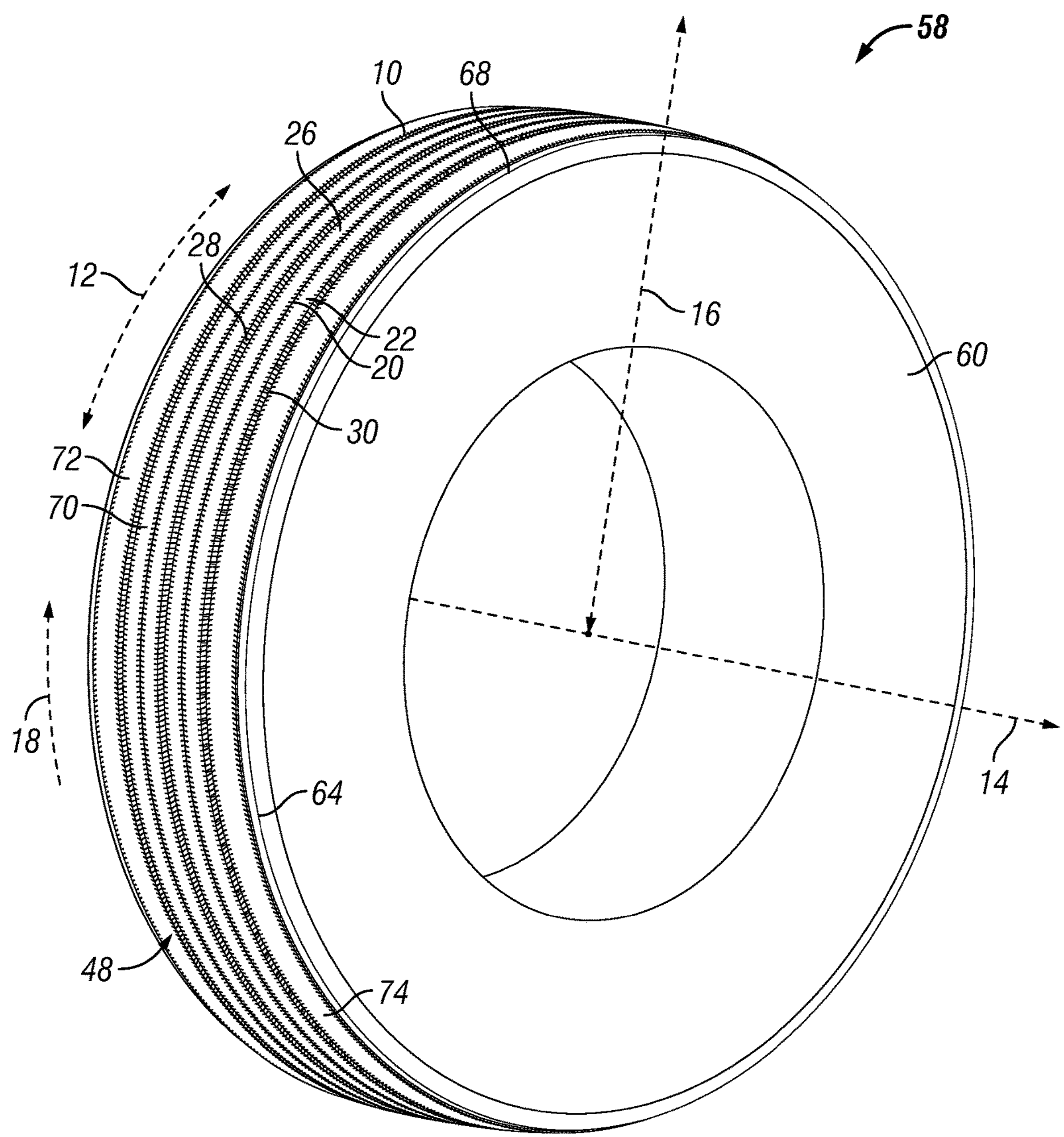
FIG. 1 is a perspective view of a heavy truck tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a tread 10 for a heavy duty truck tire 58 that has a rib 26 into which a circumferential sipe 20 is located. A plurality of micro sipes 22 extend from the circumferential sipe 20 both inboard and outboard in the lateral direction 14. The micro sipes 22 could be angled relative to the lateral direction 14 so that they extend from the circumferential sipe 20 so as to have components of extension in both the longitudinal and lateral directions 12, 14. Also, the micro sipes 22 could be angled relative to the thickness direction 16 so that the micro sipes 22 likewise have components of extension in both the longitudinal direction 12 and the thickness direction 16. The circumferential sipe 20 with micro sipes 22 feature improves the overall wear life of the tread 10 while maintaining wet traction performance. The rib 26 is not a block of the tread 10, but is instead a feature that extends completely 360 degrees around the tire 58 without being separated by a groove or other opening.

FIG. 1 shows a tire 58 that is a heavy duty truck tire 58. In this regard, the tire 58 is not designed for nor used with a car, motorcycle, or light truck (payload capacity less than 4,000 pounds), but is instead designed for and used with heavy duty trucks such as 18 wheelers, garbage trucks, or box trucks. The tire 58 may be a steer tire, a drive tire, a trailer tire, or an all position tire. The tire 58 includes a casing 60 onto which a tread 10 is disposed thereon. The tread 10 can be manufactured with the casing 60 and formed as a new tire 58, or the tread 10 can be a retread band that is attached to the casing 60 at some point after the casing 60 has already been used to form a retreaded tire 58. This is the case with all of the designs shown and described herein. They may all be tread designs of a brand new tire 58, or may be tread designs of a tread 10 for use in a retread tire 58. The central axis of the tire 58 extends through the center of the casing 60, and the lateral direction 14 of the tire 58 is parallel to the central axis. The radial direction 16, referred to also as the thickness direction 16, of the tire 58 is perpendicular to the central axis and the tread 10 is located farther from the central axis in the thickness direction 16 than the casing 60. The tread 10 extends all the way around the casing 60 in the circumferential direction 12, also referred to as the longitudinal direction 12, of the tire 58 and circles the central axis 360 degrees. The tread 10 includes a series of grooves and ribs that form a tread pattern. A rolling tread width extends in the lateral direction 14 from one shoulder tread edge 62 of the tread 10 to an opposite shoulder tread edge 64. The rolling tread width represents that portion of the tread 10 that engages the ground through normal operation of the tire 58, and the shoulder tread edges 62, 64 may engage the ground as well as the area between these locations in the lateral direction 14.

Figure 2:
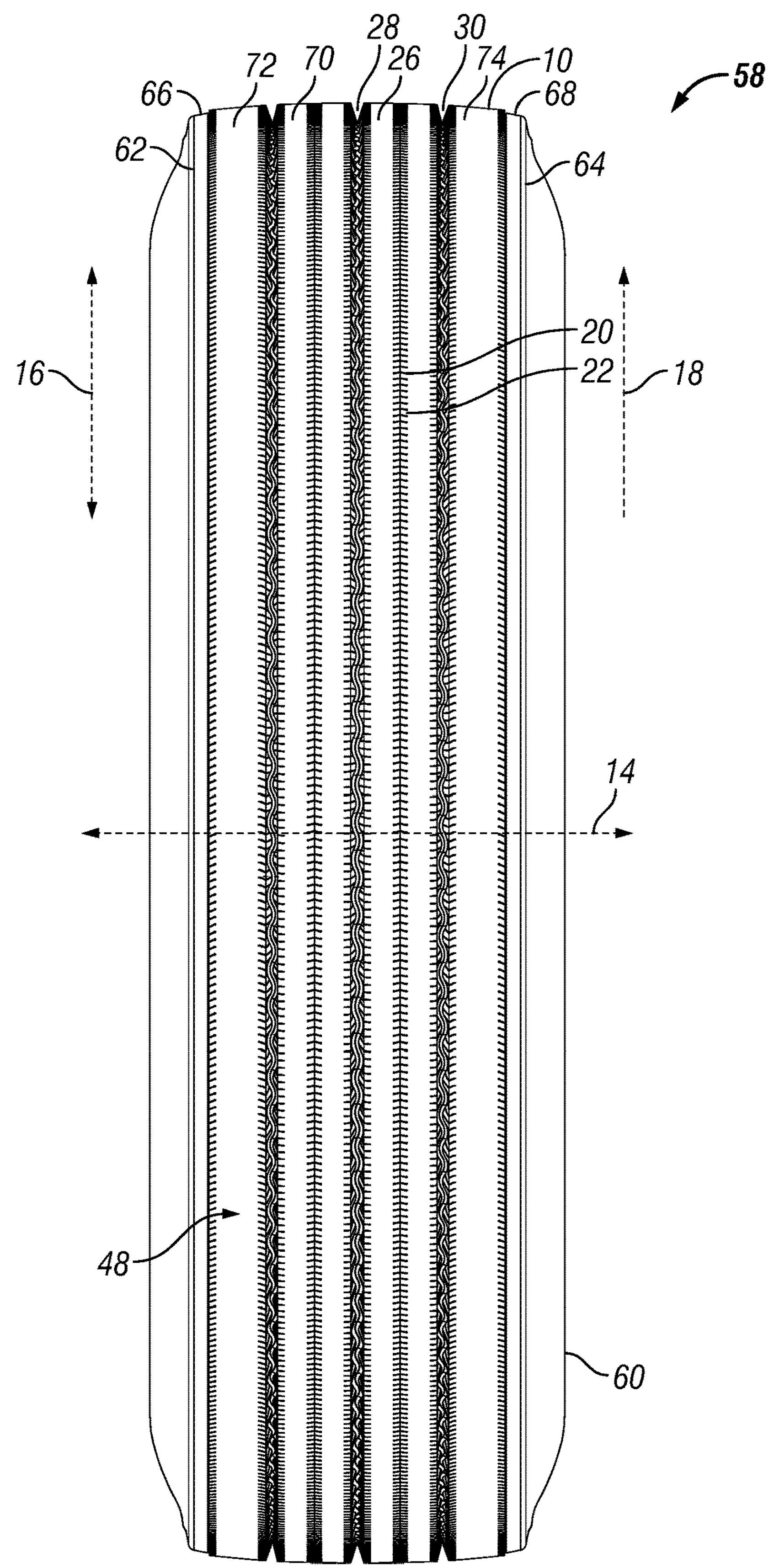
FIG. 2 is a front view of the tire of FIG. 1.
Figure 3:
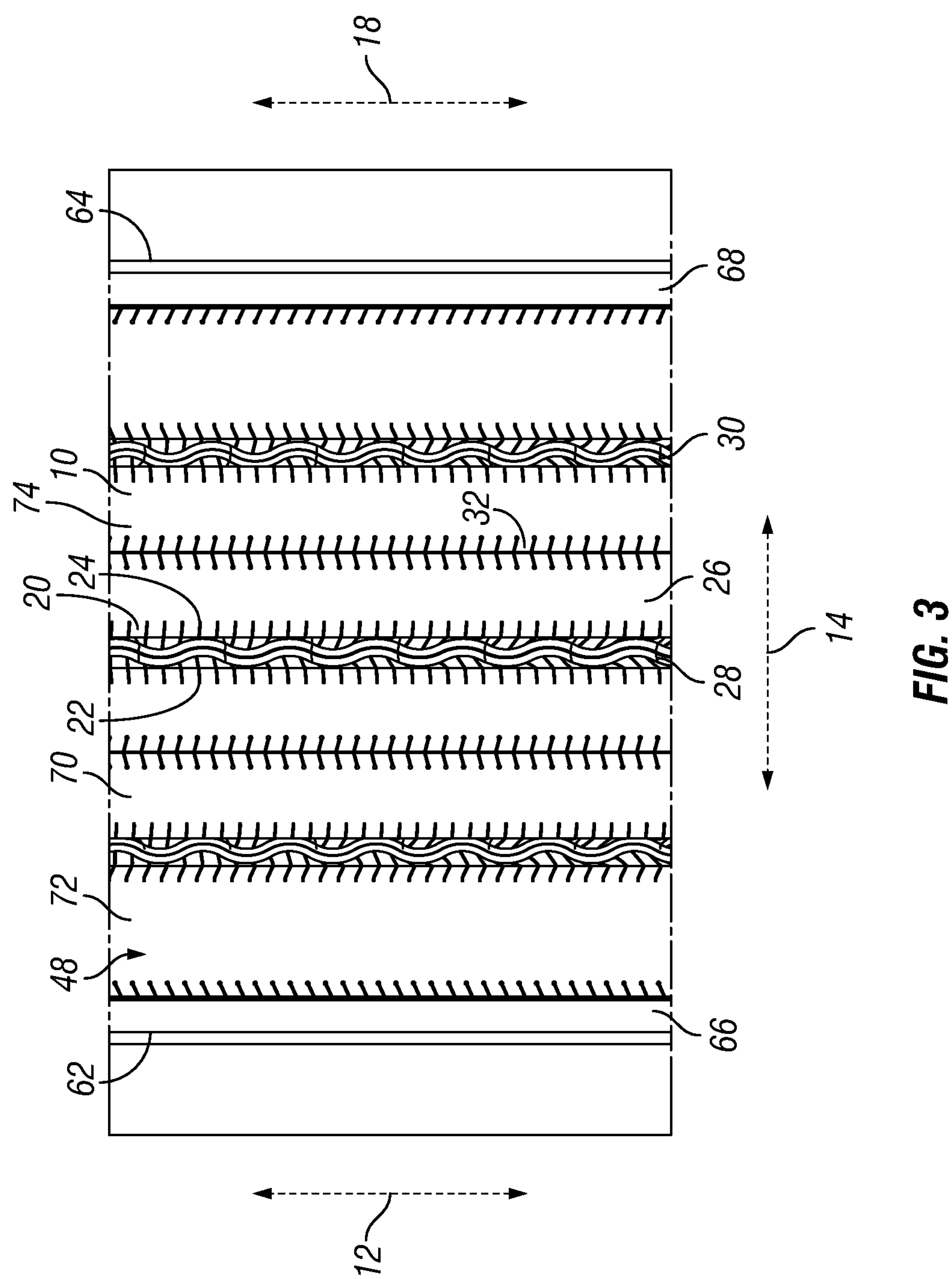
FIG. 3 is a close-up front view of the tire of FIG. 1.

The tread 10 can be part of a tire 58 or a retread band that is produced and subsequently attached to a casing 60 to form a retread tire 58. The same tread pattern can repeat throughout the entire longitudinal length of the tread 10. With reference to FIGS. 2 and 3, the tread 10 includes a number of circumferential ribs and grooves. Two interior ribs 26 and 70 are present and are separated by circumferential groove 28 and these features go around the entire tire 58 in the longitudinal direction 12. Two additional shoulder ribs 72 and 74 are present and likewise go around the entire tire 58 in the longitudinal direction 12 and are separated from the interior ribs 26, 70 by additional circumferential grooves. A sacrificial rib 66 is adjacent the shoulder rib 72, and a sacrificial rib 68 is adjacent the shoulder rib 74. The sacrificial ribs 66 and 68 do not have a height that is the same as the heights of the shoulder ribs 72, 74 in the thickness direction 16. In this regard, the heights of the sacrificial ribs 66, 68 are less than the heights of the shoulder ribs 72, 74 in the thickness direction 16. The two interior ribs 26, 70 and the two shoulder ribs 72, 74 all have heights that are the same in the thickness direction 16. Again, this thickness direction 16 could be known as the radial direction 16 such that the distances from the axial center of the tire 58 to the outer surface 48 of the tread 10 at the interior ribs 26, 70 and shoulder ribs 72, 74 are all the same. The sacrificial ribs 66, 68 are present in order to reduce irregular wear experienced by the tread 10. Circumferential cuts separate the sacrificial ribs 66, 68 from their adjacent shoulder ribs 72, 74. Micro sipes are present in the shoulder rib 72 at the circumferential cut with the sacrificial rib 66, but micro sipes are not present in the sacrificial rib 66 at this circumferential cut. Likewise, micro sipes are present in the shoulder rib 74 at the circumferential cut with the sacrificial rib 68, but there are not micro sipes present in the sacrificial rib 68 at this circumferential cut.

The grooves of the tread 10, such as the pair of circumferential grooves 28, 30 that border the circumferential rib 26, have a width that is 2 millimeters or larger. Sipes are features of the tread 10 that are smaller cuts within the tread 10 and have a width smaller than that of the grooves. The sipes, such as the micro sipes 22, have a width that is less than 2 millimeters. Although four ribs 26, 70, 72, 74 are present along with the two sacrificial ribs 66, 68, any number of ribs can be present in accordance with other embodiments and in these other embodiments the two sacrificial ribs 66, 68 may or may not be present. The tread 10 is directional in that it is designed for forward rotation of the tire 58, but the tread 10 need not be directional in other exemplary embodiments. The rolling direction 18 is the direction in the longitudinal direction 12 the tread 10 is designed to rotate. The various features of the tread 10 can be arranged so that the tread 10 experiences improved irregular wear performance characteristics when the tread 10 rotates in the rolling direction 18, as opposed to opposite the rolling direction 18. This improvement will generally lead to an increased removal mileage, since tires 58 with irregular wear may be removed from service well before reaching the normal removal tread depth or wear bars. Some of these directional features could be the angularity of grooves and sipes within the tread 10.

As can be seen in FIG. 2, the rib 26 into which the circumferential sipe 20 is located has the same height across its entire length in the lateral direction 14. The circumferential sipe 20 splits the rib 26 into two halves, and each one of these two halves has outer surfaces 48 located the same distance from the center of the tire 58 in the thickness direction 16. However, due to inflation of the tire 58 the outer surface 48 could be curved. It is to be understood that when speaking of heights/distances of the outer surfaces 48 they may be measured by taking measurements from a flat tread band from the bottom of this tread band to the outer surfaces 48. Alternatively, when two outer surfaces 48 or any other number of surfaces are described as being at the same height in the thickness direction 16, they are being described in such a way that there is no tread 10 depth offset between these surfaces 48. As such, in the illustrated embodiment, there is not a tread depth offset or step across the circumferential sipe 20 in the lateral direction 14 such that there is no tread depth step or offset between the two outer surfaces 48 on either side of the circumferential sipe 20. It may very well be the case that when inflated the tire 58 exhibits outer surfaces 48 that have multiple heights in the thickness direction 16 at various locations in the lateral direction 14, but there are no offsets or steps between these surfaces 48 and they would all exhibit the same height if the tread 10 were removed from the carcass 60 and measured.

The placement of the circumferential sipe 20 and micro sipes 22 into this rib is distinguished between the placement of micro sipes into the shoulder ribs 72, 74 because these shoulder ribs 72, 74 are adjacent the sacrificial ribs 66, 68 that have outer surfaces 48 at different heights in the thickness direction 16 as compared to the heights of the outer surfaces 48 of the shoulder ribs 72, 74 in the thickness direction 16. The circumferential sipe 20 may be located at the midpoint of the rib 26 in the lateral direction 14 so that equal portions of the rib 26 are inboard and outboard of the circumferential sipe 20 in the lateral direction 14.

Figure 4:
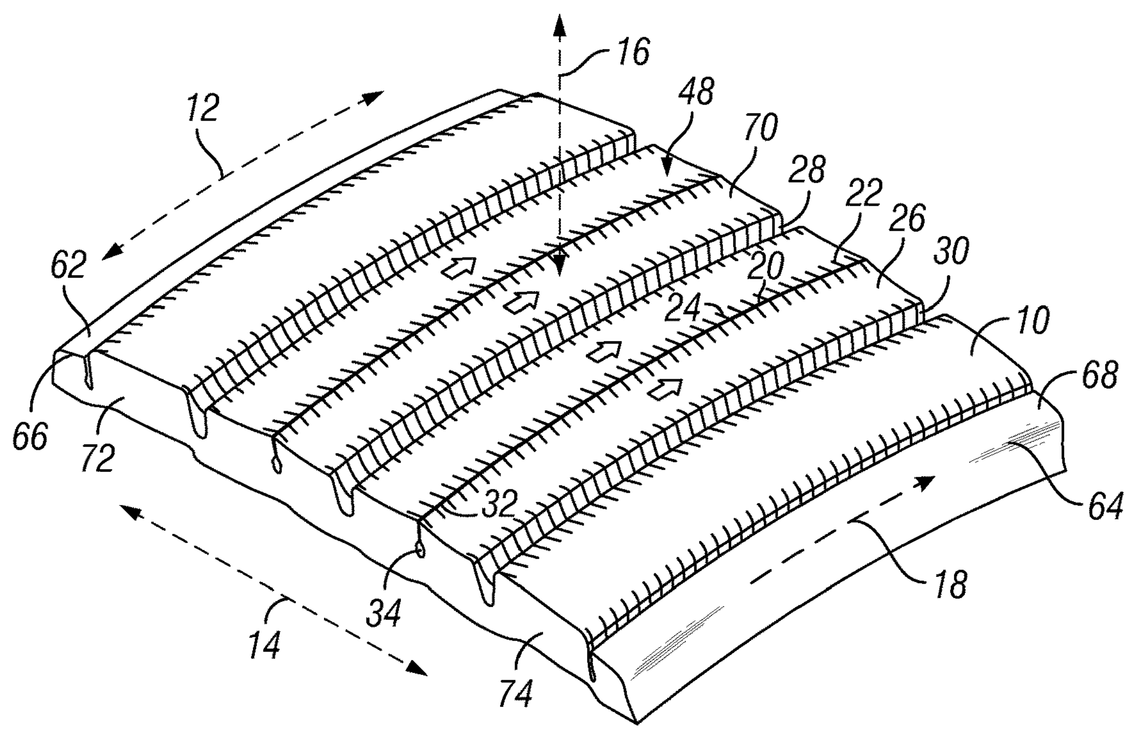
FIG. 4 is a perspective view of a portion of a tread in accordance with another exemplary embodiment.

FIG. 4 shows a section of the tread 10 in perspective view as having a series of arrows on the outer surface 48 of the tread 10 to indicate to the user the rolling direction 18. Rolling direction 18 markings could additionally or alternatively be placed on the casing 60 or at the tread edges 62, 64. The interior rib 26 has a circumferential sipe 20 that runs along its entire length such that the circumferential sipe 20 circles the entire tire 58 360 degrees in the longitudinal direction 12 about its central axis. A plurality of micro sipes 22 extend from the circumferential sipe 20 on both sides of the circumferential sipe 20 such that the micro sipes 22 extend both inboard and outboard from the circumferential sipe 20 in the lateral direction 14. The circumferential sipe 20 has a body 32 that is at the outer surface 48 and that extends into the interior of the tread 10. The circumferential sipe 20 also has a teardrop 34 at the lower end of the body 32 that is within the tread 10 and is closest to the center of the tire 58 in the thickness direction 16. The other interior rib 70 has a circumferential sipe and micro sipes arranged identically as those present within the interior rib 26. Description of the arrangement of these features 20, 22 in the interior rib 70 is not needed as the description of them as discussed with reference to the interior rib 26 is applicable. The shoulder ribs 72, 74 and the sacrificial ribs 66, 68 do not include a similar circumferential sipe with micro sipes, but one or more of these ribs could in accordance with other exemplary embodiments.

Figure 5:
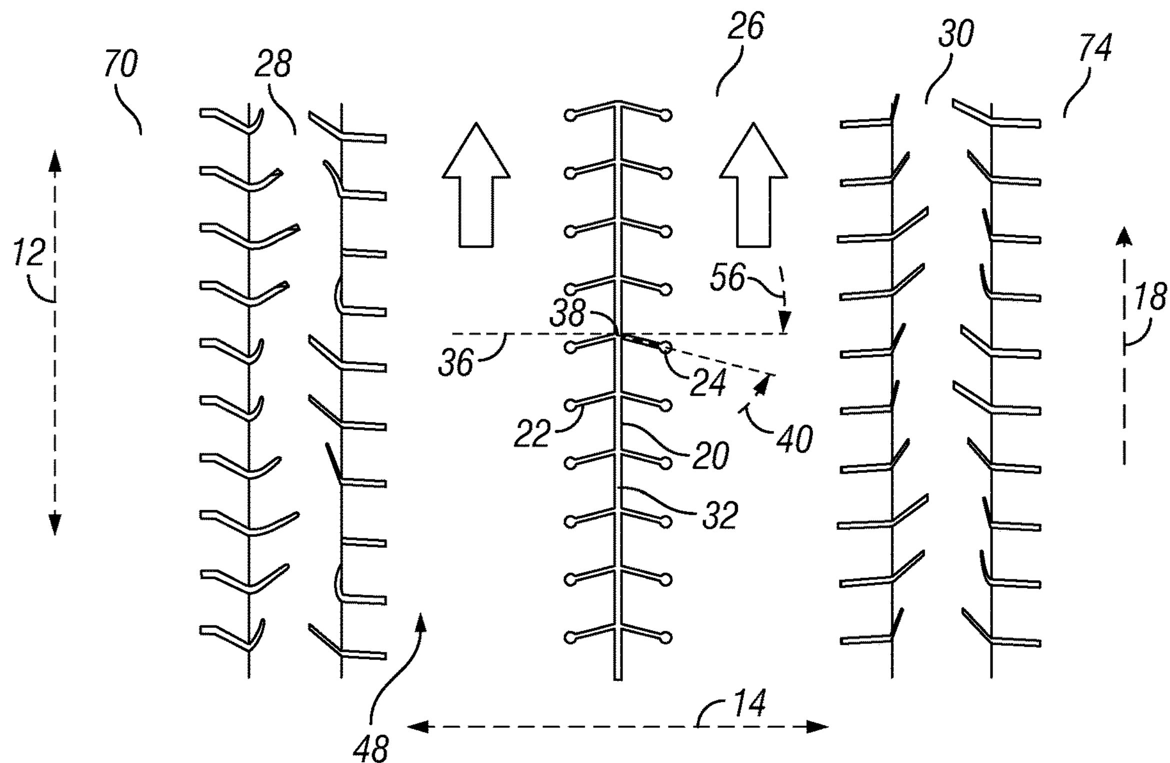
FIG. 5 is a close-up front view of the tread of FIG. 4.

A front view of a portion of the tread 10 is shown in FIG. 5 in which is visible the rib 26 which is between the two circumferential grooves 28, 30. The circumferential sipe 20 is straight and extends in a straight line in the longitudinal direction 12. The micro sipes 22 engage the circumferential sipe 20 and are located on both sides of the circumferential sipe 20 in the lateral direction 14. The circumferential sipe 20 and the micro sipes 22 all are present at the outer surface 48 and extend into the interior of the tread 10. The micro sipes 22 are arranged so that ones on opposite sides of the circumferential sipe 20 are not staggered but are instead at the same position in the longitudinal direction 12. The micro sipes 22 could alternatively be staggered in accordance with other exemplary embodiments. The micro sipes 22 are linear in shape extending from the circumferential sipe 20 but have circular shaped terminal ends 24. In other arrangements, the micro sipes 22 have a linear shape with no circular shaped terminal ends 24. All of the micro sipes 22 could be arranged in the same manner in that they all have the same shape and size and are all angled in the same direction relative to the lateral direction 14.

The micro sipes 22 are blind in that they extend from the circumferential sipe 20 and terminate into the tread 10 before reaching the grooves 28, 30 or any other feature besides simply the interior of the rib 26. The micro sipes 22 are not full width sipes that extend across the entire rib 26. If the circumferential sipe 20 is located right in the middle of the rib 26 in the lateral direction 14 so that half of the rib 26 is inboard of the circumferential sipe 20 and the other half of the rib 26 is outboard of the circumferential sipe 20, then the micro sipes 22 extend less than half of the overall width of the rib 26 in the lateral direction 14. The circumferential sipe 20 may be positioned in the middle of the rib 26 so that the two halves of the rib 26 have the same length as one another in the lateral direction 14. The micro sipes 22 generate coupling forces to reduce or eliminate irregular wear.

At the outer surface 48 of the tread 10 and extending into in the thickness direction 16 for at least a majority of the depth of the micro sipes 22, the micro sipes 22 are angled relative to the lateral direction 14. In particular, the micro sipes 22 are angled such that they have a component of extension in the lateral direction 14 and a component of extension in the longitudinal direction 12 upon extension from the circumferential sipe 20. The circumferential sipe 20 engages the micro sipe 22 at the outer surface 48 at an engagement point 38. A lateral reference line 36 extends in the lateral direction 14 and goes through this engagement point 38. The micro sipe 22 extends from the engagement point 38 to its terminal end 24. A surface extension line 40 is a line at the outer surface 48 that extends from the engagement point 38 through the terminal end 24. If the micro sipe 22 is wavy or curved or has an irregular shape, the surface extension line 40 would still be a straight line that extends from the engagement point 38 to the terminal end 24.

The surface extension line 40 is arranged at an angle 56 to the lateral reference line 36. The angle 56 is measured so that it is smaller than 90 degrees, as this angle 56 could alternatively be measured to be greater than 270 degrees. The micro sipe 22 is arranged so that its component of extension in the longitudinal direction 12 from the circumferential sipe 20 is opposite to that of the rolling direction 18. Although only a single micro sipe 22 is described as having the angle 56, all of the micro sipes 22 that extend from the circumferential sipe 20 may be have these features and can all be arranged in an identical manner. The micro sipes 22 on the opposite side of the circumferential sipe 20 are likewise arranged in an identical manner and have a component of extension in the longitudinal direction 12 that is opposite to the rolling direction 18. Other micro sipes in the tread 12, for example those shown in FIG. 5 in the interior rib 70 have components of extension in the longitudinal direction 12 that are in the same direction as the rolling direction 18.

The length of extension of the micro sipes 22 in the lateral direction 14 can be measured by taking a straight line measurement from the terminal end 24 to the circumferential sipe 20 in the lateral direction 14. Alternatively, the extension across the rib 26 could be measured by drawing a straight line from the engagement point 38 in the lateral direction 14 to the lateral position of the terminal end 24, not necessarily on the terminal end 24 but just at its lateral position should the micro sipes 22 be angled. This length of extension in the lateral direction 14 could be from 2 millimeters to 10 millimeters. If the length of extension were smaller than this range the micro sipes 22 would not be effective in providing irregular wear protection. If the length of extension were greater than this range, the wider micro sipes 22 would make the rib 26 too flexible and reduce wear performance. The preferred length of extension in the lateral direction 14 of the micro sipes 22 is from 4 to 6 millimeters.

The spacing of the micro sipes 22 in the longitudinal direction 12, sometimes referred to as density since it determines the number per length, will also impact the irregular wear performance reduction. If the micro sipe 22 spacing is small, the micro sipes 22 will not be robust, and if the spacing is too large then the micro sipes 22 will not be effective in fighting irregular wear. The spacing of the micro sipes 22 can be measured by measuring the straight line distance between successive engagement points 38 of successive micro sipes 22 in the longitudinal direction 12. Acceptable micro sipe 22 spacing is from 3 millimeters to 10 millimeters. Preferred micro sipe spacing is from 4 millimeters to 6 millimeters.

The width of the micro sipes 22 is their wall to wall distance. The widths of the micro sipes 22 can be the same along their entire lengths or may vary. If varied, the widths of the micro sipes 22 can be measured as the width of the majority of the length of the micro sipes 22. If there is no majority, then the largest width of the micro sipe 22 can be assigned as the thickness of the micro sipe 22. Acceptable micro sipe 22 widths may be from 0.1 to 2.0 millimeters. Preferred width of the micro sipe 22 is from 0.4 millimeters to 0.6 millimeters. Thinner micro sipes 22 are not practical, and micro sipes 22 greater than the acceptable range may reduce wear performance of the tread 10.

The micro sipes 22 can have a depth in the thickness direction 16 from the outer surface 48 that is from one third of the full tread 10 depth to the full tread depth. A preferred micro sipe 22 depth may be from ¾$^{th}$ the full tread 10 depth to the full tread 10 depth less 2 millimeters.

The micro sipes 22 are blind in that they extend across a portion of the rib 26 in the lateral direction 14, but not all the way across the rib 26. The micro sipes 22 extend from the circumferential sipe 20 some amount in the lateral direction 14 and then terminate short of the grooves 28, 30 so that they do not engage another tread 10 feature besides the circumferential sipe 20. In this regard, if the adjacent grooves 28, 30 have micro sipes extending from them, the micro sipes 22 do not engage the grooves 28, 30 or the micro sipes of the grooves 28, 30. Likewise, micro sipes that engage the grooves 28, 30 extend into the interior rib 26 and terminate short of the circumferential sipe 20 and micro sipes 22 so that the only tread 10 features they engage are the circumferential grooves 28, 30 themselves. The width of the micro sipes 22 can be the same as or larger than the widths of the micro sipes located at the shoulder ribs 72, 74 adjacent the sacrificial ribs 66, 68. The length of extension of the micro sipes 22 can be the same as or greater than the length of extension in the lateral direction 14 of the micro sipes located at the shoulder ribs 72, 74 adjacent the sacrificial ribs 66, 68. The length of extension in the lateral direction 14 could be measured by measuring from the engagement point 38 to the lateral position of the terminal end 24 in the lateral direction 14. This length would be a straight line in the lateral direction 14 that extends from the engagement point 38 and ends in the tread 10 outer surface 48 at the same position as the position of the terminal end 24 in the lateral direction 14.

Figure 6:
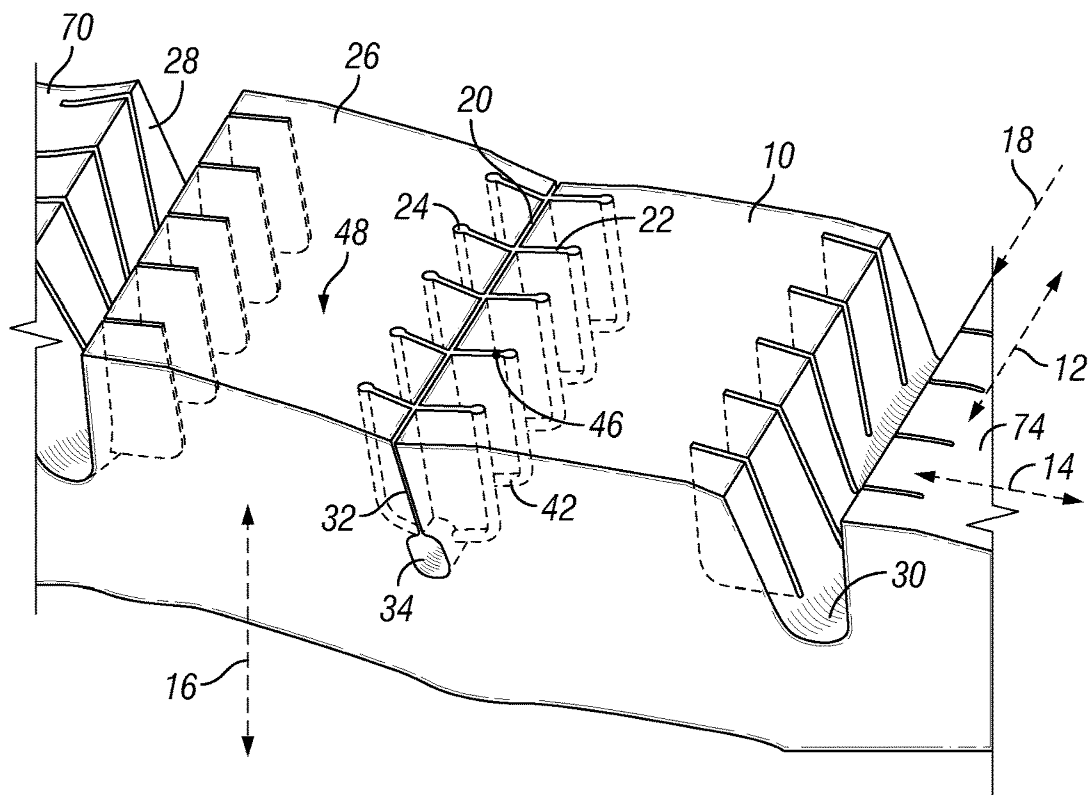
FIG. 6 is a close-up perspective view of a portion of the tread that shows internal features of the tread below its outer surface.
Figure 7:
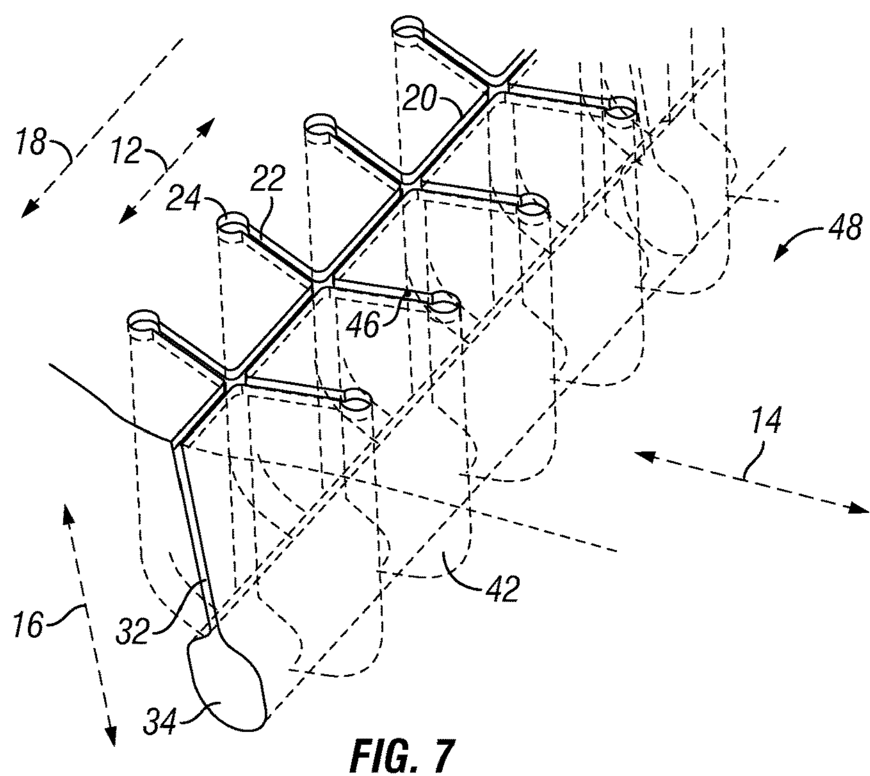
FIG. 7 is a close-up perspective view of a circumferential sipe and micro sipes showing portions of these features below the outer surface.

FIGS. 6 and 7 show details of the circumferential sipe 20 and micro sipes 22 below the outer surface 48. The circumferential sipe 20 has a body 32 that is linear in cross-sectional shape and extends from the outer surface 48 into the interior of the tread 10. In other embodiments, the body 32 is not linear in shape but could be wavy, angled, curved, non-linear, have sections of differing widths, or may be irregular in shape. A teardrop 34 is located at the bottom of the body 32 in the thickness direction 16 and widens from the body 32 to the widest point of the circumferential sipe 20 in the lateral direction 14 and then closes upon itself at the bottom of the teardrop 34. The micro sipes 22 engage, and thus open up into the body 32, and extend along the entire height of the body 32 in the thickness direction 16. The micro sipes 22 also engage the teardrop 34 and open into the teardrop 34. However, the micro sipes 22 do not extend along the entire height of the teardrop 34 in the thickness direction 16 but only extend along an upper portion of the teardrop 34 in the thickness direction 16. The micro sipes 22 have a rectangular cross-sectional shape along a majority of their lengths. However the portion of the micro sipes 22 farthest from the circumferential sipe 20 at the terminal ends 24 have a circular cross-sectional shape, and the very bottom of the micro sipes 22 in the thickness direction 16 that engage the teardrop 34 likewise have circular cross-sectional shapes. The teardrop 34 is an optional feature and need not be included in the circumferential sipe 20 in all embodiments. The circumferential sipe 20 is shown as being straight, but could be wavy, curved, angled or irregular in shape around the circumference of the tire 58 in the longitudinal direction 12 in other embodiments.

Figure 8:
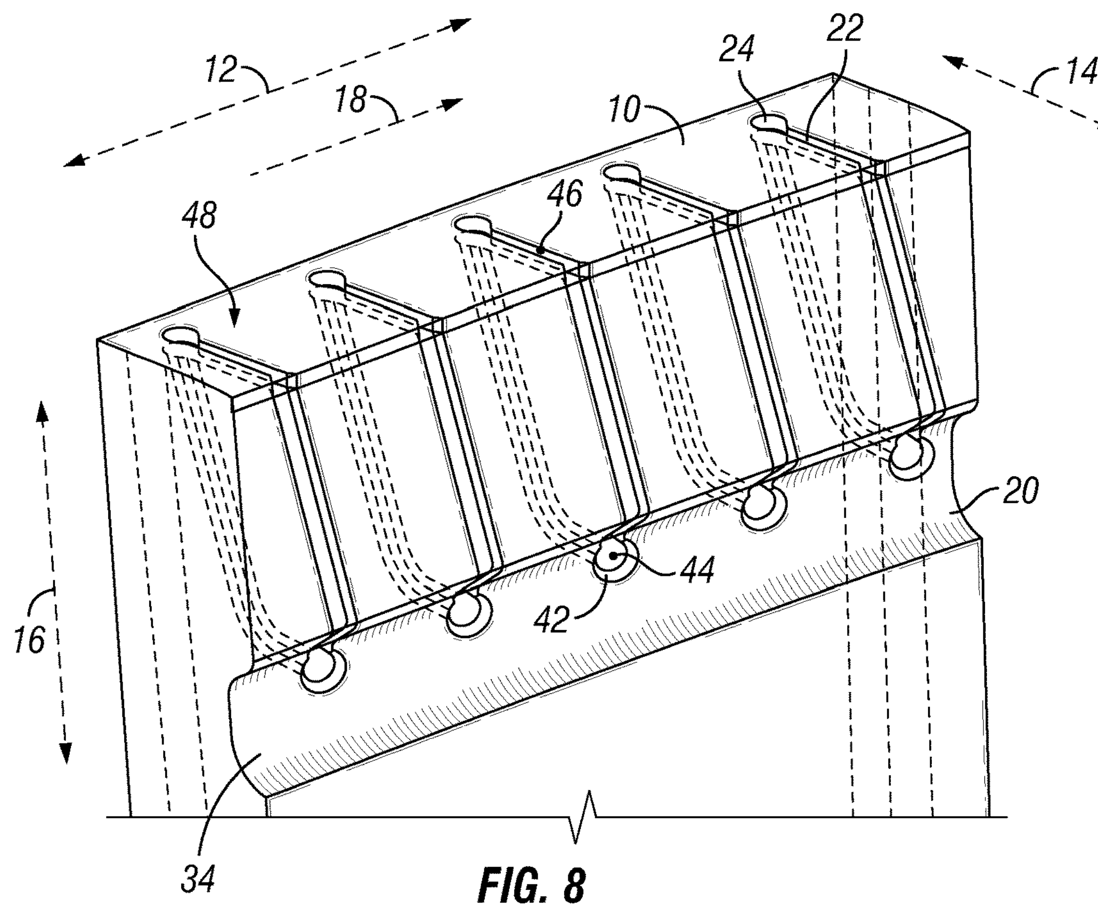
FIG. 8 is a perspective cross-sectional view of a portion of the tread taken through a circumferential sipe.

Referring now to FIG. 8, a cross-section of a portion of the tread is shown taken through the circumferential sipe 20. The micro sipes 22 engage the teardrop 34 and the body 32 of the circumferential sipe 20 so that a fluid communication channel may be established between all of these features. The angularity of the micro sipes 22 may be the same so that their entire structure is oriented in the same position relative to the various tread 10 directions 12, 14, 16. Alternatively, the micro sipes 22 may be angled or wavy or have various shapes so that their orientations in the various directions 12, 14, 16 are different at different portions of the micro sipes 22.

Figure 9:
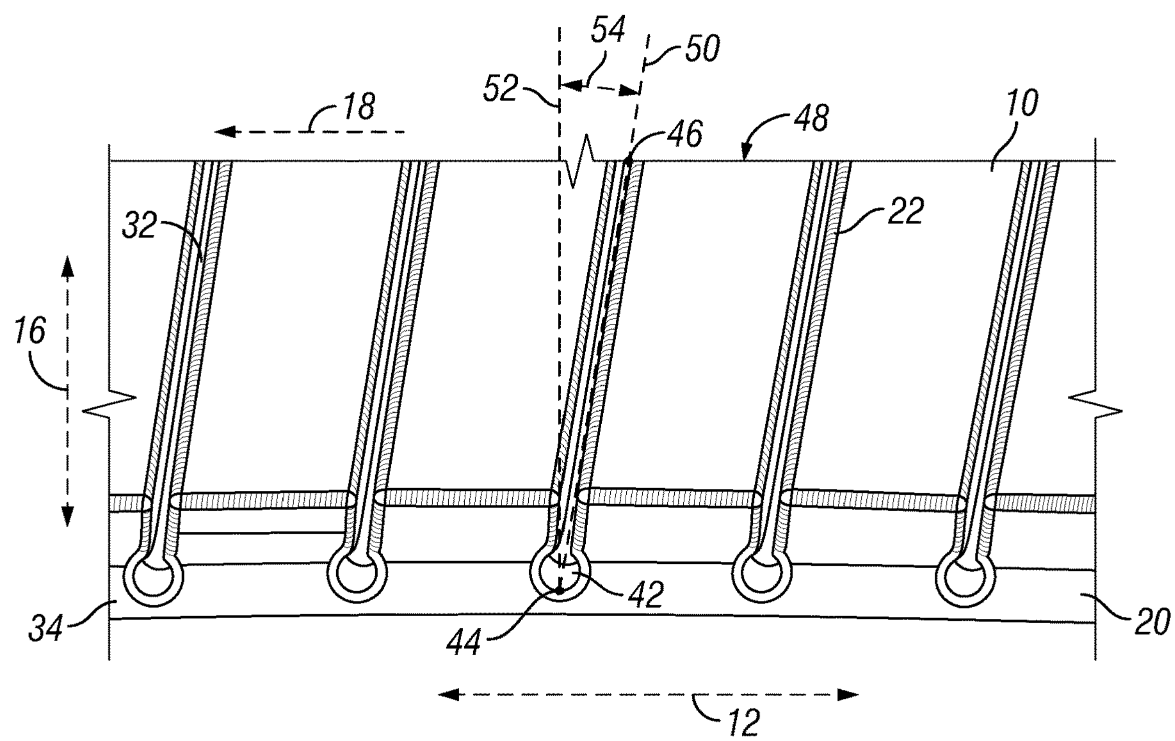
FIG. 9 is a front cross-sectional view of a portion of the tread taken through a circumferential sipe.

FIG. 9 is a cross-sectional view taken in the longitudinal direction 12 through the circumferential sipe 20 along a portion of the tread 10. The body 32 of the micro sipes 22 are oriented relative to the thickness direction 16 so that they have a components of extension that are not only in the thickness direction 16, but in both the longitudinal direction 12 and the thickness direction 16. The micro sipes 22 can be angled relative to the thickness direction 16 so that they extend from the circumferential sipe 20 in the longitudinal direction 12 away from the rolling direction 18. Such an inclination may be referred to as a negative micro sipe 22 inclination angle. A sipe top point 46 is present at the top of the micro sipe 22 at the outer surface 48. The micro sipe 22 extends into the tread 10 until it terminates at a sipe bottom 42 which is the location farthest from the opening at the sipe top point 46. A sipe bottom point 44 is noted at a location at the sipe bottom 42. A sipe inclination line 50 extends from the sipe bottom point 44 to the sipe top point 46. The bottom 42 of the micro sipe 22 has a circular cross-sectional shape, but this feature is optional in other embodiments. The sipe inclination line 50 is a straight line through points 44 and 46 and would still be a straight line even if the body 32 were wavy, curved, angled, or irregular in shape.

A reference line 52 extends through the sipe bottom point 44 and through the outer surface 48. The reference line 52 is oriented completely in the thickness/radial direction 16 and does not have a component in the longitudinal/circumferential direction 12 or the lateral/axial direction 14. The inclination of the micro sipe 22 is observed upon comparison of the orientation of the sipe inclination line 50 to the reference line 52. The sipe inclination line 50 is oriented at a sipe inclination angle 54 to the reference line 52. The sipe inclination angle 54 may be from 10 degrees to 45 degrees, from 11 degrees to 45 degrees, from 10 degrees to 20 degrees, from 11 degrees to 20 degrees, from 10 degrees to 15 degrees, from 5 degrees to 15 degrees, from 13 degrees to 23 degrees, from 15 degrees to 28 degrees, from 15 degrees to 30 degrees, from 18 degrees to 28 degrees, from 20 degrees to 25 degrees, from 20 degrees to 45 degrees, or from 12 degrees to 23 degrees in accordance with various exemplary embodiments.

The inclination of the sipe inclination line 50 to the reference line 52 is negative in direction in that it is against the rolling direction 18 of the tread 10. In this regard, the sipe bottom point 44 is configured to enter the contact patch of the tread 10 as it engages the ground before the sipe top point 46. The reference line 52, the sipe bottom point 44, the sipe inclination line 50, the sipe top point 46, and the sipe inclination angle 54 all fall within a common plane. The cross-section in FIG. 9 likewise falls within this common reference plane so all of these elements can be viewed in relation to one another. This common reference plane extends in the longitudinal direction 12, and the lateral direction 14 is perpendicular to this common reference plane. All of the micro sipes 22 that engage the circumferential sipe 20 can be provided to have the same sipe inclination angle 54.

The micro sipes 22 can thus be arranged so that they have a sipe inclination angle that is greater than zero, and so that that they have an angle 56 that is non-zero. Alternatively, the micro sipes 22 can be arranged so that they have one of these angles 54 or 56 zero and the other angle 54 or 56 non-zero. Still further, exemplary embodiments exist in which both of the angles 54 and 56 are zero degrees. The angle 56 may be greater than or equal to a counterpart angle of the micro sipes in the shoulder ribs 72, 74 adjacent the sacrificial ribs 66, 68.

The sipe inclination angle 54 may be from 0 degrees to 30 degrees. In the preferred embodiment, the sipe inclination angle 54 is from 5 degrees to 20 degrees. The sipe inclination angle 54 could be in some embodiments higher than a counterpart sipe inclination angle of the micro sipes in the shoulder ribs 72, 74 adjacent to the sacrificial ribs 66, 68 which normally have a sipe inclination angle of 8.5 degrees. Such a sipe inclination angle is effective at providing global irregular wear protection. However, the micro sipes 22 that are not at the shoulder ribs 72, 74/sacrificial ribs 66, 68 interfaces are less sensitive to the formation of irregular wear and can be higher than 8.5 degrees. Concerning the angle 56 of the micro sipes 22, acceptable angles 56 may be plus or minus 45 degrees. Angles steeper than plus or minus 45 degrees may compromise robustness of the tread 10. In a preferred embodiment, the angle 56 is within the range of plus or minus 30 degrees.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A heavy truck tire tread, comprising:

a longitudinal direction, a lateral direction, and a thickness direction, wherein the tread is a directional tread and has a rolling direction that is in the longitudinal direction;

a circumferential rib that extends completely 360 degrees around the tread in the longitudinal direction, wherein the circumferential rib is not a block of the tread and is not separated by a groove;

a first circumferential groove that extends completely 360 degrees around the tread in the longitudinal direction;

a second circumferential groove that extends completely 360 degrees around the tread in the longitudinal direction, wherein the circumferential rib is between the first and second circumferential grooves in the lateral direction and engages both the first and second circumferential grooves;

a circumferential sipe that extends in the longitudinal direction completely around the tread, wherein the circumferential sipe does not bound a sacrificial rib, wherein the circumferential sipe is located in the circumferential rib and extends completely 360 degrees around the circumferential rib in the longitudinal direction, wherein the circumferential sipe has a body and a teardrop, wherein the teardrop is located farther than the body from an outer surface of the tread in the thickness direction;

a plurality of micro sipes that engage the circumferential sipe and are located on opposite sides of the circumferential sipe in the lateral direction, wherein the micro sipes extend from the circumferential sipe so as to terminate within rubber of the tread at a terminal end, wherein the plurality of micro sipes include a first micro sipe that extends from the circumferential sipe at a non-zero angle to the lateral direction so as to have a component of extension in the longitudinal direction opposite to that of the rolling direction, wherein the plurality of micro sipes includes a second micro sipe that extends from the circumferential sipe at a non-zero angle to the lateral direction so as to have a component of extension in the longitudinal direction opposite to that of the rolling direction, wherein the first and second micro sipes are both blind and both engage the circumferential sipe at a common location in the longitudinal direction, wherein the plurality of micro sipes are positioned around an entire length of the circumferential sipe completely around the tread and all of the micro sipes around the length of the circumferential sipe completely around the tread have the same shape and size;

wherein the first micro sipe has a circular cross-sectional shaped first terminal end that extends from the outer surface of the tread into the circumferential rib in the thickness direction, wherein the first micro sipe has a circular cross-sectional shaped first bottom that engages the teardrop and the first terminal end and is the portion of the first micro sipe farthest from the outer surface in the thickness direction;

wherein the second micro sipe has a circular cross-sectional shaped second terminal end that extends from the outer surface of the tread into the circumferential rib in the thickness direction, wherein the second micro sipe has a circular cross-sectional shaped second bottom that engages the teardrop and the second terminal end and is the portion of the second micro sipe farthest from the outer surface in the thickness direction.

2. The tread as set forth in claim 1, wherein the micro sipes terminate within the rubber of the tread such that the micro sipes do not extend to and engage either one of the first or second circumferential grooves on opposite sides of the circumferential rib in the lateral direction.

3. The tread as set forth in claim 1, wherein the outer surface of the tread on opposite sides of the circumferential sipe in the lateral direction that engage the circumferential sipe is not offset in the thickness direction.

4. The tread as set forth in claim 1, wherein the body and the teardrop extend in a straight orientation in the longitudinal direction completely around the tread.

5. The tread as set forth in claim 1, wherein the non-zero angle of the first micro sipe is measured via a lateral reference line that extends in the lateral direction through an engagement point located at the engagement of the first micro sipe with the circumferential sipe, wherein a surface extension line extends through the engagement point to the terminal end of the first micro sipe, wherein the surface extension line is oriented at the non-zero angle that is 45 degrees to the lateral reference line.

6. The tread as set forth in claim 1, wherein the first micro sipe has a sipe bottom, wherein a sipe bottom point is located at the sipe bottom, wherein a sipe top point is located at the first micro sipe at the outer surface of the tread having the same position as the sipe bottom point in the lateral direction, wherein a sipe inclination line extends from the sipe bottom point to the sipe top point, wherein a reference line extends in the thickness direction through the sipe bottom point, and wherein the reference line does not have a component in the longitudinal direction or the lateral direction, wherein the sipe inclination line is at a sipe inclination angle to the reference line that is not zero degrees.

7. The tread as set forth in claim 6, wherein the sipe inclination angle is 20 degrees to 45 degrees, wherein the sipe bottom point is configured to approach a contact patch before the sipe top point upon forward motion of the tread.

8. The tread as set forth in claim 1, wherein the terminal ends of the micro sipes are from and including 4 millimeters to 6 millimeters from the circumferential sipe in the lateral direction.

9. The tread as set forth in claim 1, wherein the micro sipes are spaced from successive ones of the micro sipes in the longitudinal direction a distance from and including 4 millimeters to 6 millimeters.

10. The tread as set forth in claim 1, wherein the micro sipes have a width from and including 0.4 millimeters to 0.6 millimeters.

11. A heavy truck tire that has the tread of claim 1.

* * * * *